United States Patent [19]

Weaver

[11] 4,435,511

[45] Mar. 6, 1984

[54] GLASSES SUITABLE FOR SEALING FERRITES

[75] Inventor: Edward A. Weaver, Toledo, Ohio

[73] Assignee: Owens-Illinois, Inc., Toledo, Ohio

[21] Appl. No.: 416,821

[22] Filed: Sep. 13, 1982

[51] Int. Cl.$^3$ .................... C03C 3/08; C03C 3/10
[52] U.S. Cl. .................... 501/22; 360/122; 501/16; 501/27; 501/61; 501/62; 501/70; 501/76
[58] Field of Search ............ 501/61, 76, 16, 22, 501/27; 252/62.62; 360/122

[56] References Cited

U.S. PATENT DOCUMENTS

| | | | |
|---|---|---|---|
| 3,778,242 | 12/1973 | Francel et al. | 501/22 |
| 3,843,541 | 10/1974 | Chiba et al. | 252/62.62 |
| 3,862,831 | 1/1975 | Berkenblit et al. | 501/16 |
| 3,988,697 | 10/1976 | Cooley | 501/76 |
| 4,001,741 | 1/1977 | Lindig et al. | 501/61 |
| 4,111,708 | 9/1978 | Flannery et al. | 501/61 |

FOREIGN PATENT DOCUMENTS 50-32212  3/1975  Japan .................... 501/76

57-135419  8/1982  Japan .................... 360/122

*Primary Examiner*—Helen M. McCarthy
*Attorney, Agent, or Firm*—David R. Birchall; Myron E. Click

[57] ABSTRACT

A glass having a composition which would result by mixing from 20 to 80 weight percent of glass A with 80 to 20 weight percent of glass B and melting the mixture to form a homogeneous glass:

| Glass A | | Glass B | |
|---|---|---|---|
| | Weight Percent | | Weight Percent |
| $SiO_2$ | 1.8–2.2 | $SiO_2$ | 67–70 |
| $B_2O_3$ | 14–16.5 | $Li_2O$ | 14–17 |
| PbO | 69–72 | $Al_2O_3$ | 4–5.5 |
| ZnO | 8.2–9.2 | CaO | 9–12 |
| BaO | 2.7–3.5 | | | said glass having a coefficient of thermal contraction from 15° C. below the annealing point to room temperature of from 106 to $115 \times 10^{-7}$/°C.

1 Claim, No Drawings

GLASSES SUITABLE FOR SEALING FERRITES

The present invention relates to a range of glass compositions which are suitable for sealing or coating other glasses, ceramics, metals and the like and which have a fairly low fiber softening point, thus enabling sealing to a wide variety of materials without distorting said materials.

The glass compositions of the present invention have a narrow range of coefficients of contraction but a fairly wide range of fiber softening points.

One object of the present invention is to provide glasses suitable for sealing to certain ferrites. One group of such ferrites are manganese-zinc ferrites having coefficients of contraction of from about 104 to about $110 \times 10^{-7}/°C$. over the range from 15° C. below the glass annealing point down to room temperature.

Another object is to provide glasses suitable for sealing to such ferrites and other materials which glasses are fairly nonreactive at sealing temperatures, particularly with respect to such ferrites.

Still a further object is to provide a series of glass suitable for sealing other materials which have a fairly wide range of fiber softening points but a relatively narrow range of coefficients of contraction as above defined.

These and other objects are provided by glasses of the invention which have a composition which would result by mixing from 20 to 80 weight percent of glass A with 80 to 20 weight percent of glass B and melting the mixture to form a homogeneous glass:

| Glass A | | Glass B | |
|---|---|---|---|
| | Weight Percent | | Weight Percent |
| $SiO_2$ | 1.8–2.2 | $SiO_2$ | 67–70 |
| $B_2O_3$ | 14–16.5 | $Li_2O$ | 14–17 |
| PbO | 69–72 | $Al_2O_3$ | 4–5.5 |
| ZnO | 8.2–9.2 | CaO | 9–12 |
| BaO | 2.7–3.5 | | | said glass having a coefficient of thermal contraction from 15° C. below the annealing point to room temperature of from 106 to $115 \times 10^{-7}/°C$.

Of course, while such glasses could be made by mixing glasses A and B and melting, in most the glasses are actually made by melting ordinary starting materials to produce the desired final glass as above defined.

In Table 1 are shown four glasses of the invention and their properties. Glasses 1-4 could respectively have resulted from mixing 20, 40, 60 and 80 weight percent of a glass of a composition of glass A with 80, 60, 40 and 20 weight percent of a glass of a composition of glass B. Of course, the glasses were actually made by mixing batch raw materials in the usual manner.

TABLE 1

| Glass | 1 | 2 | 3 | 4 |
|---|---|---|---|---|
| $SiO_2$ | 15.35 | 28.71 | 42.06 | 55.42 |
| $B_2O_3$ | 12.48 | 9.36 | 6.24 | 3.12 |
| ZnO | 7.04 | 5.28 | 3.52 | 1.76 |
| PbO | 56.4 | 42.3 | 28.2 | 14.1 |
| BaO | 2.48 | 1.86 | 1.24 | 0.62 |
| $Al_2O_3$ | 0.97 | 1.94 | 2.92 | 3.89 |
| $Li_2O$ | 3.13 | 6.27 | 9.40 | 12.54 |
| CaO | 2.14 | 4.28 | 6.40 | 8.56 |
| St. Pt. | 361 | 381 | 395 | 409 |
| A.P. | 382 | 405 | 422 | 438 |
| F.S.P. | 461 | 495 | 523 | 551 |
| αSP | 107.8 | 109.1 | 111.4 | 113.8 |

αSP = Coefficient of thermal contraction from 15° C. below A.P. to room temperature
F.S.P. = Fiber softening point
St. Pt. = Strain point
A.P. = Annealing point For instance, glass 1 was made by mixing the following pure batch materials in the quantities indicated in Table 2.

TABLE 2

| Batch Material | Parts by Weight |
|---|---|
| Silica Sand | 40.6282 |
| Alumina | 7.2692 |
| Boric Acid, Anhydrous | 94.5282 |
| Lithium Carbonate | 58.2161 |
| High Calcite Limestone | 29.4123 |
| Barium Carbonate | 23.9652 |
| Lead Monosilicate | 497.5658 |
| Zinc Oxide | 52.8972 |

As will be evident to those skilled in the art, various modifications of this invention can be made or followed in the light of the foregoing disclosure and discussion without departing from the spirit and scope of the disclosure or from the scope of the claims.

I claim:

1. A glass suitable for sealing to ferrites such as manganese-zinc ferrites and consisting essentially of a composition which would result by mixing from 20 to 80 weight percent of glass A with 80 to 20 weight percent of glass B and melting the mixture to form a homogeneous glass:

| Glass A | | Glass B | |
|---|---|---|---|
| | Weight Percent | | Weight Percent |
| $SiO_2$ | 1.8–2.2 | $SiO_2$ | 67–70 |
| $B_2O_3$ | 14–16.5 | $Li_2O$ | 14–17 |
| PbO | 69–72 | $Al_2O_3$ | 4–5.5 |
| ZnO | 8.2–9.2 | CaO | 9–12 |
| BaO | 2.7–3.5 | | | said glass having a coefficient of thermal contraction from 15° C. below the annealing point to room temperature of from 106 to $115 \times 10^{-7}/°C$.

* * * * *